H. M. PAINE.

Car Spring.

No. 667. Reissued Feb. 15, 1859.

Witnesses { Charles D. Freeman, Henry Howson } W. L. Leisenring, Pres. Nathan Middleton, Treas. Wm. F. Noble, Sec. } of the Rail Road Car Spring Co, Phil^a

H. PETERS, PHOTO-LITHOGRAPHER, WASHINGTON, D. C.

UNITED STATES PATENT OFFICE.

RAILROAD CAR SPRING COMPANY, ASSIGNEES OF HENRY M. PAINE, OF PHILADELPHIA, PENNSYLVANIA.

IMPROVEMENT IN RAILROAD-CAR SPRINGS.

Specification forming part of Letters Patent No. 18,515, dated October 27, 1857; Reissue No. 667, dated February 15, 1859.

*To all whom it may concern:*

Be it known that the RAILROAD CAR SPRING COMPANY, of Philadelphia, a corporation chartered by the Commonwealth of Pennsylvania, has become the owner of Letters Patent for an Improvement in Railroad-Car Springs, granted to HENRY M. PAINE, of Worcester, Massachusetts, which Letters Patent bear date the 27th day of October, 1857, and which are deemed by the said company insufficient and inoperative by reason of a defective specification, which defect has arisen from inadvertence and mistake. Now, we, HENRY G. LEISENRING, NATHAN MIDDLETON, and WM. S. NOBLE, the president, treasurer, and secretary of, and acting for and on behalf of, the aforesaid company, hereby declare the following to be a full, clear, and exact description of the aforesaid invention, reference being had to the accompanying drawings and to the letters of reference marked thereon.

The invention of the aforesaid HENRY M. PAINE consists of a car-spring composed of a body of hair felt or other fibrous material compressed to a given density between two rigid plates, and prevented from expanding or recoiling beyond that density by an attachment of the two plates to each other, the whole forming a new article of manufacture—namely, a railroad-car spring, cheap as regard construction and easy but determined in its action.

In order to enable others to make and use the invention, we will now proceed to describe the manner in which we carry it into effect.

Figure 1:
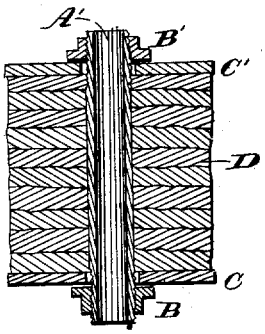
Figure 2:
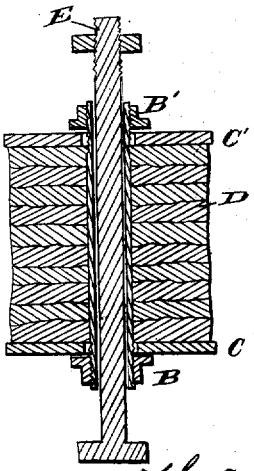

Figures 1 and 2 in the annexed drawings, which form a part of this specification, are sectional views of HENRY M. PAINE'S improved railroad-car spring.

C and C′ are two metal plates or disks, between which is a compressed mass, D, of fibrous material.

Layers of common hair felting, placed one above another, have been found in practice peculiarly well adapted to form the body intervening between the two plates, although masses of wool, cotton, and other fibrous material may be used to advantage, either alone or mixed with each other or with the hair felt. Whatever fibrous material be used, however, it is essential to the efficient carrying out of this invention that it should be compressed to a given density and not allowed to expand or recoil from that density, which must depend upon the superincumbent pressure and the severity of the shocks to which the spring has to be submitted. A mass of fibrous material collected together without any regard to a proper amount of density would, when applied as car-springs, certainly serve to soften any shocks to which the car might be subjected; but it would merely serve as a "buffer," having no determined recoil, which is indispensable to all efficient car-springs.

In constructing the spring of hair felt, the lower plate, C, with the tubular tie-bolt A and its nut B, (the upper nut, B′, being removed,) is placed on the bed of a suitable press. Disks of hair felt, with holes punched through them, are then fitted over the tubular bolt and deposited in layers on the plate C to the amount desired. The upper plate, C′, is then placed on the top of the felt and the press put in operation until the layers of felt are compressed to the desired density, when the upper nut, B′, is screwed onto the top of the bolt until it bears on the upper plate, C′. The pressure is then removed and the ends of the bolts riveted (if necessary) to the nuts, so as to afford additional security and effectually prevent the recoil of the felt beyond the limit to which it has been compressed. After the projecting edges of the felt disks have been smoothed off level with the edges of the plate the spring is complete and ready for the market.

As we have before observed, the density to which the fibrous material should be compressed depends upon the weight and shocks to which the spring has to be subjected. The most reliable plan to ascertain the proper density is by actual experiment with a set of springs, and by following the result of the experiment as a guide. For springs used under ordinary circumstances the hair felt should be compressed to about one-half of its original capacity.

Whatever force or pressure may be applied to springs thus constructed, they will invariably recoil to the original point to which they had first been compressed. The bolt A is made tubular in the present instance, in order to admit the solid bolt E, by which the spring may be attached to its place on the car. Ordinary plain bolts, however, may be used, providing they are furnished with substantial heads or nuts, or are so securely riveted as to prevent the possibility of the fibrous material expanding. In some instances two, or even more, bolts may be used to advantage, the number of such bolts, in fact, depending upon the size of the spring.

We are aware that layers of felt have been heretofore applied as bumper-springs to railway-cars, such a device being shown in the English patent of W. W. Taylor, February 1, 1841. In that instance, however, the felt was simply confined to a plate by a yielding leather cover secured by cords, without any regard to a given condensation of the felt so as to obtain a proper recoil. We therefore do not claim, broadly, the application of fibrous material in the manufacture of car springs; but

We claim and desire to secure by Letters Patent, as the invention of the aforesaid HENRY M. PAINE, and as a new manufacture—

A railroad-car spring consisting of a body of felt or other fibrous material condensed to a given density between two rigid plates and prevented from expanding beyond that density by a bolt or bolts, substantially as herein set forth.

In testimony whereof we have signed our names to this specification in the presence of two subscribing witnesses.

H. G. LEISENRING.
NATHAN MIDDLETON.
WM. S. NOBLE.

Witnesses:
CHARLES D. FREEMAN,
HENRY HOWSON.